Patented June 11, 1929.

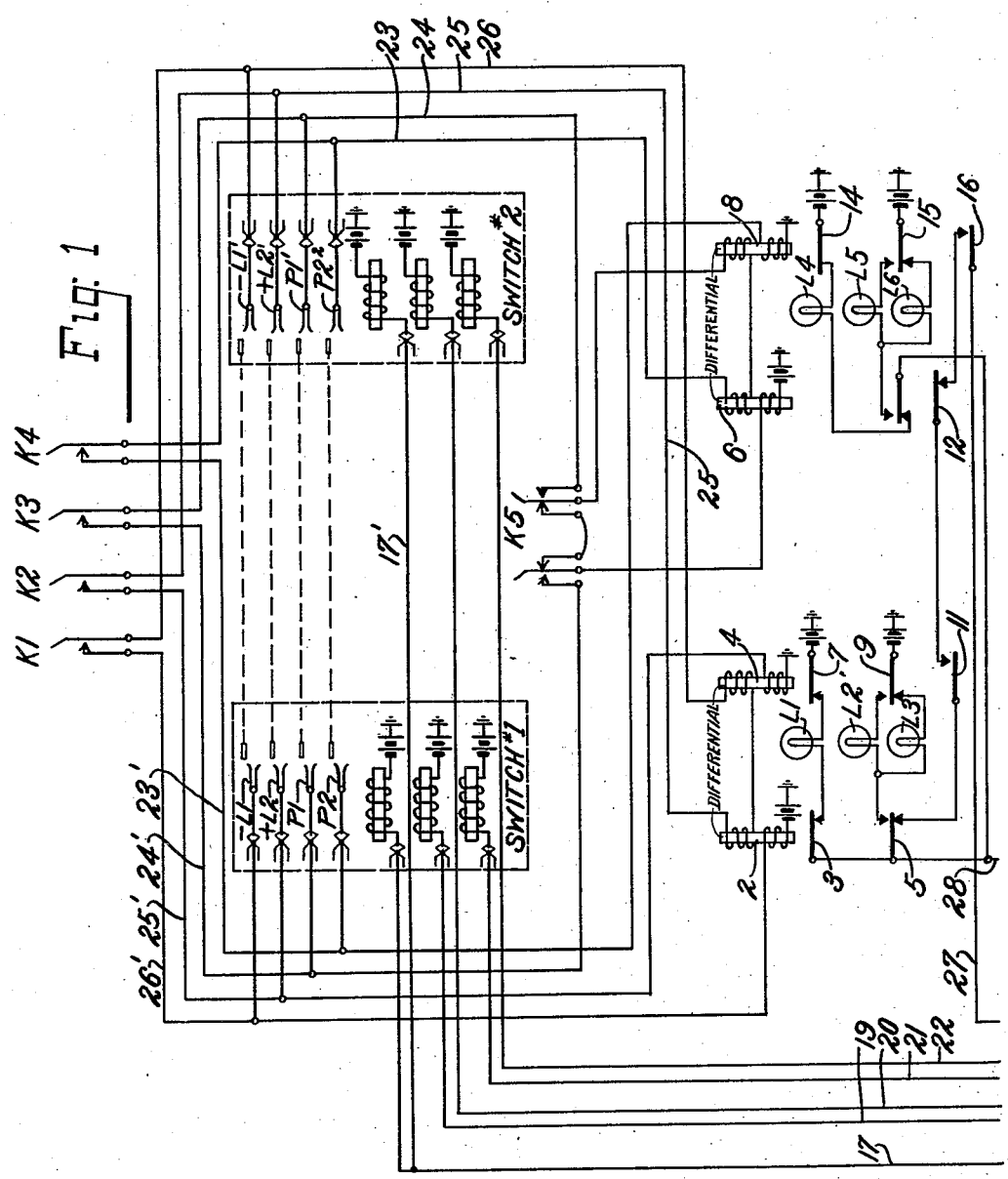

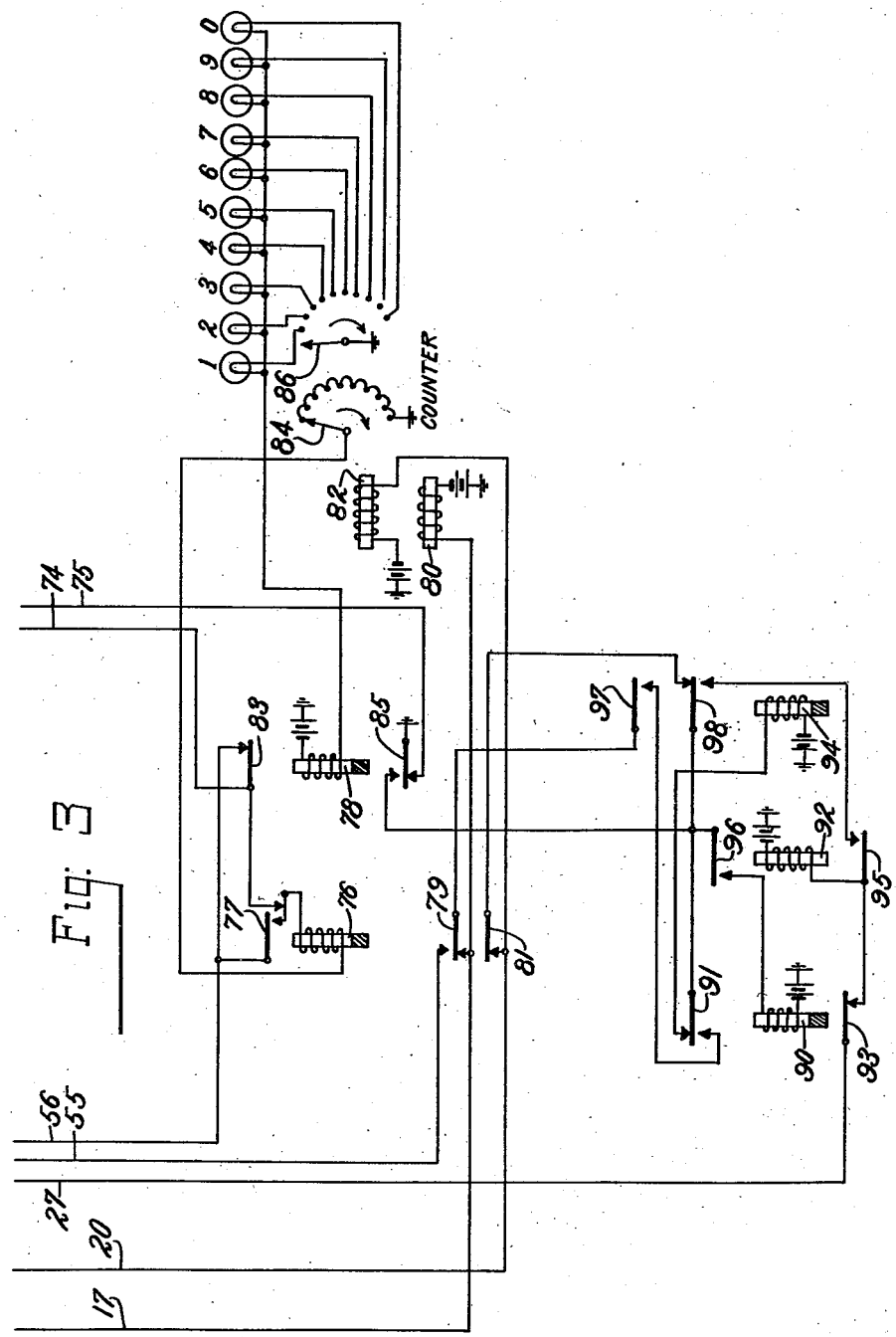

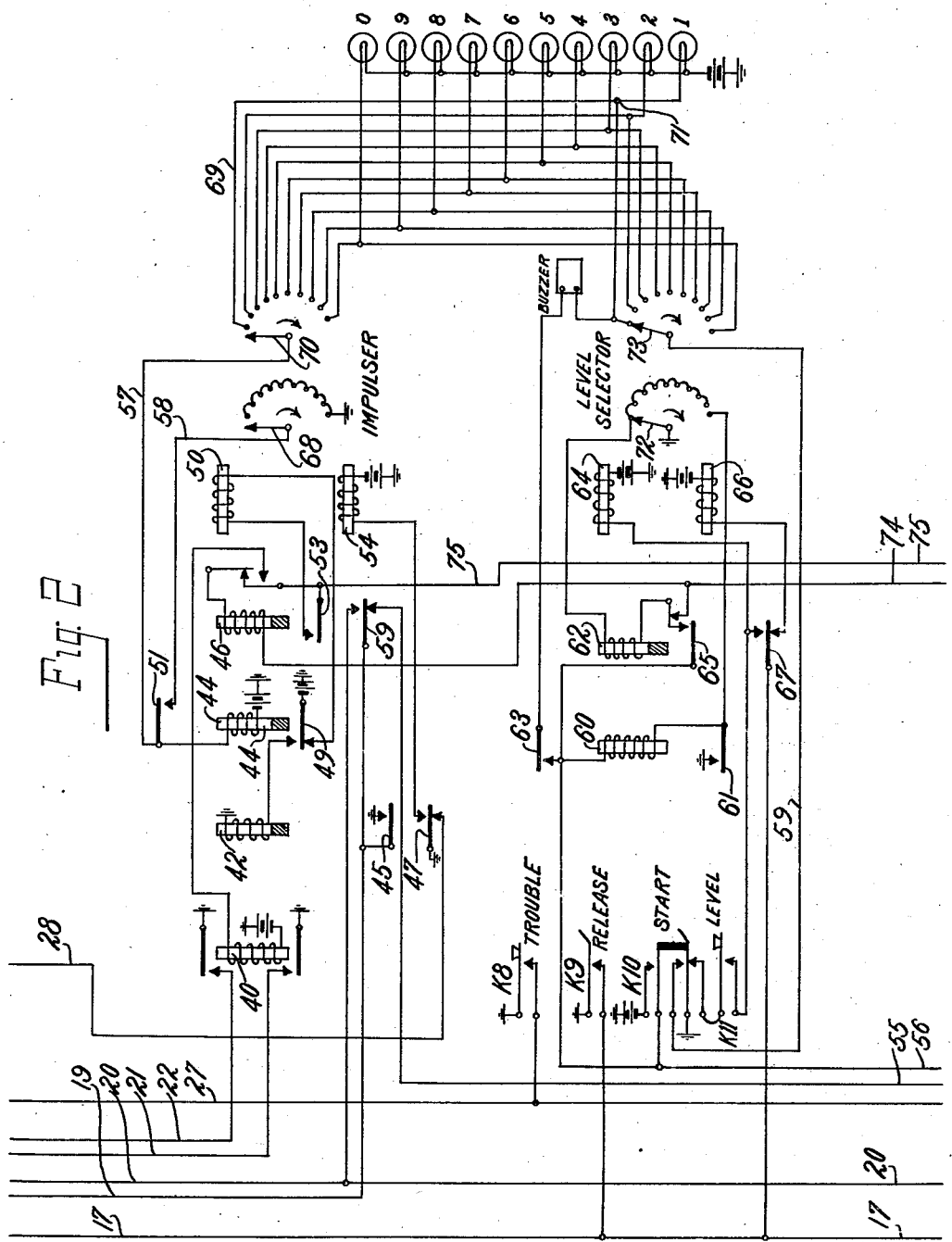

1,716,471

UNITED STATES PATENT OFFICE.

VICTOR S. THARP, OF ELMHURST, ILLINOIS, ASSIGNOR, BY MESNE ASSIGNMENTS, TO AUTOMATIC ELECTRIC INC., OF CHICAGO, ILLINOIS, A CORPORATION OF DELAWARE.

TESTING EQUIPMENT.

Application filed March 22, 1926. Serial No. 96,462.

The present invention relates in general to testing equipment, but is particularly concerned with the provision of appropriate equipment for use in the making of various tests on bank multiples extending between the bank contacts of Strowger automatic switches, although not being particularly limited to this use.

One object of the invention is to provide equipment of the foregoing character which will test for open circuits, short circuits, and reversals, and give visual indications of the trunk line in trouble and the character of trouble encountered.

Another object is to provide equipment which may be conveniently associated with the various conductors to be tested and which will make these tests with great accuracy and speed.

The foregoing results are accomplished by the various circuits and apparatus illustrated in the drawings, in which—

Fig. 1 discloses a number of manually operable keys K1 to K5, inclusive, which may be of any well known non-locking type, with the exception of K5, which is of the locking type; a number of relays for controlling circuits for a number of trouble indicating lamps L1 to L6, inclusive; the operating and release magnets and associated wipers of two Strowger switches indicated as #1 and #2; and various circuits connecting these elements in accordance with the invention.

Fig. 2 discloses a number of manually operable keys K8 to K11; a set of level indicating lamps bearing designations 1 to 0; and a pair of automatic step-by-step switches designated "impulser" and "level selector", respectively. The "impulser" switch is provided for the purpose of causing the transmission of impulses to the switches #1 and #2. The "level selector" is for causing the associated lamps to indicate on what level tests are being made, and for variably controlling the extent of movement of the impulser. The various associated relays are provided to control the switches as will be explained subsequently. The switches are of the type which are stepped around by a pawl and ratchet mechanism and then restored to normal by a spring when the associated release magnet is operated. Various connecting circuits are provided linking this figure with Fig. 1.

Fig. 3 discloses a plurality of lamps for indicating the particular trunks being tested in the level indicated by one of the lamps shown in Fig. 2. The lamps of Fig. 3 are selected by a counter switch which is of the type disclosed in Fig. 2. The three relays at the bottom of this figure are provided to automatically transmit impulses to rotate switches #1 and #2. Circuits are also shown connecting the equipment of this figure with the foregoing Figs. 1 and 2.

In order to make all points of the invention clear, it is deemed advisable to explain the various procedures followed in making the foregoing mentioned tests. In order to follow the explanation Figs. 1, 2, and 3, of the drawings should be placed with their corresponding lines in alignment, this bringing Fig. 1 at the top, Fig. 2 below Fig. 1 and Fig. 3 at the bottom.

We will assume first that no provision has been made for moving the Strowger switches from one set of conductors to be tested to another, and in this way concentrate on the description of testing of the multiples, after which a description of the automatic operation of the switches following each test will be given.

The switch #1, we will assume, is the first switch in a row of ten switches, the switch #2 the tenth, and that the multiples terminating in the first set of bank contacts accessible to these switches are the first to be tested. The attendant first connects the testing equipment with the wipers of the two switches by means of clips and jumpers provided for this purpose and may then, in any well known manner, either manually or electrically cause the switches to position their wipers on the first set of contacts. Since the switches illustrated have two private or test wipers, the attendant also operates key K5. A circuit may now be traced from battery, lower winding of differential relay 2, conductor 26', wiper —L1 through the line multiple being tested, wiper —L1' conductor 26, the upper winding of differential relay 4, upper winding of differential relay 2, conductor 25, wiper +L2', second line multiple, wiper +L2, conductor 25' and the lower winding of differential relay 4 to ground. The direction of current flow over the above circuit through the relay 2 is such that the relay 2 remains inert. The direction of current flow in the upper winding of relay 4 however, is in the proper direction to assist or cooperate with the current flow in its lower winding and this relay therefore operates, to prevent lamp L1 from lighting at this time.

Another circuit extends from battery, lower winding of differential relay 6, operated contacts of key K5, wiper P1, the private multiple, wiper P1', operated contacts of key K5, upper winding of differential relay 8, upper winding of differential relay 6, conductor 23, wiper P2², the private multiple, wiper P2, conductor 23', and the lower winding of differential relay 8 to ground. The direction of current flow with respect to the windings of relays 6 and 8 is such that relay 8 only, operates. The combined effect of operating relays 4 and 8 prevents any of the indicating lamps lighting which signifies that all multiples of the trunk are O. K.

If the line multiples are short circuited the upper winding of relays 2 and 4 will be shunted and therefore both relays 2 and 4 will operate. Relay 2 at armature 5 will complete a circuit for lamp L2, from ground supplied through armature 47 and its resting contact, conductor 28, armature 5 and its working contact lamp L2, through front contact and operated armature 9 of relay 4 to battery.

If there is a short circuit between the private or test conductors the upper winding of relay 6 and the upper winding of relay 8 will be shunted and, therefore, relay 6 will operate instead of relay 2 and a circuit will be completed for lamp L5, from the ground on conductor 28 via armature 13 and armature 15 to battery.

If either of the line multiples are open no circuit can be completed for relay 4 as the circuit of this relay includes both line conductors, and the windings of relay 2 in series. Relay 6 will not operate because the current flow is in the improper direction, but relay 8 will operate as usual to prevent L4 from lighting. Due to the failure of relay 4, however, a circuit is completed for lamp L1, from battery, armature 7 and its resting contact lamp L1 resting contact and armature 3 to ground on conductor 28.

If one of the private conductors are open, the operating circuit for relays 6 and 8 will be open and only relay 4 will operate to prevent L1 from lighting. Since relays 8 and 6 are both restored under this condition, lamp L4 will light.

When an open multiple is encountered the attendant operates the correct one of the keys K1 to K4 to determine which conductor of the pair is open. The actuation of the key connected in multiple with the open conductor will, of course, result in the lamps being extinguished during the time the key is operated.

Now if lines —L1 and L2 are reversed the current flow in the upper windings of relays 2 and 4 will be reversed. Relay 2, therefore, will operate instead of relay 4. This results in a circuit being completed for lamp L3.

If the private conductors are reversed relay 6 operates instead of relay 8 and the reversed condition is indicated by lamp L6 lighting.

If the switches are only provided with three wipers, the tests may be made by restoring the key K5 to the position shown in the drawing thereby cutting out this part of the test equipment.

When the foregoing tests have been made the attendant may position the switches #1 and #2 on the next set of bank contacts over which a test is to be made.

It will be appreciated that if the attendant is required to manually position these switches in connection with each set of multiples the testing will require much time. Therefore, in order to expedite the testing, apparatus has been provided for causing the switches themselves to automatically connect with the next group of multiples to be tested if those previously tesed were O. K., and it requires but the operation of a key to cause the test to proceed in case the last test made showed some irregularity.

An explanation of the operation will now be given of the added equipment which causes the testing operation to proceed automatically over all multiples of all levels as long as no irregularities are found.

The attendant proceeds as before except that instead of manually placing the wipers of the two Strowger switches into engagement with the first set of contacts to be tested she operates the start key K10, which closes circuits for operating relays 76, 62 and 46 and also closes the circuit of the number one level lamp. The circuit of relay 76 extends from ground supplied from the grounded bank and wiper 84 of the counter switch, winding of relay 76, springs controlled by armature 77, armature 83 and its resting contact to start conductor 56 and battery supplied by key K10.

The circuit of relay 62 extends from the grounded wiper 72 and bank contact of the level selector, through the winding of relay 62, springs controlled by this relay, conductor 74 and through the armature 83 and its resting contact to conductor 56. The circuit of start relay 46 extends from battery on conductor 56, resting contact and armature 83, conductor 74, winding of relay 46, armature and resting contact of motor magnet 50 of the impulser switch, conductor 75, and the resting contact and grounded armature 85 of relay 78.

The circuit of the number 1 level lamp extends from ground at K10 over conductor 59, wiper 73 to the lamp, and battery. Relay 76, upon operating, at armature 77 completes a holding circuit for itself independent of relay 78, and at armatures 79 and 81 prepares circuits which will be traced subsequently.

Relay 62, upon operating, at armature 65 completes a holding circuit for itself independent of conductor 74, and at armature 67 opens a point in the operating circuit of release magnet 66 of the level selector and at the front contact of this armature prepares an operating circuit for the motor magnet 64 of this switch.

Relay 46 upon operating at its armature 53 and its working contact connects the grounded conductor 75 to the winding of motor magnet 50 causing this magnet to operate and advance its wipers 68 and 70 one step. The motor magnet in operating also opens the circuit of relay 46 and completes an operating circuit for relay 40. The relay 40, upon operating, at its upper and lower armatures applies ground to conductors 21 and 22 which terminate in the vertical magnets of the Strowger switches #2 and #1. These switches therefore operate to elevate the wipers one step opposite the first row of contacts in their respective banks. The wiper 70, of the impulser switch, upon reaching its first contact completes a circuit for slow release relay 44, from battery winding of relay 44, conductor 57, wiper 70, conductor 69 to the dividing point 71, the first bank contact and wiper 73 of the level selector to ground. Relay 44 upon operating, at its armature 51 completes a locking circuit for itself by way of conductor 58, and wiper 68 and its associated bank contact to ground, at its armature 49 breaks the circuit of the motor magnet 50, and at the front contact of this armature completes a circuit for slow release relay 42. The motor magnet 50 upon restoring again closes the previously described operating circuit of relay 46 which has not restored due to its slow release characteristic. The magnet 50 is not operated again however due to its circuit being open at armature 49.

The relay 42 upon operating, at its armature 45 applies ground to conductor 19 direct and to conductor 20 by way of armature 59, which conductors extend to the rotary magnets of switches #1 and #2 and battery. These magnets accordingly operate to position their wipers onto the first set of contacts to be tested. A branch of conductor 20 also extends to the operating magnet 82 of the counter switch causing it to advance its wipers 84 and 86 one step. The wiper 86 upon engaging its first contact completes a circuit for lamp 1 of the contact group indicating lamps and relay 78 in series. Since the 1 lamps of both level and contact groups are now lighted they indicate that the #1 contact multiple in the first level is the one being tested.

The relay 78, upon operating, at armature 83 breaks the connections between conductors 56 and 74 causing relay 46 to restore, and at its armature 85 completes a circuit for relay 94 by way of armature 91 and its resting contact. The relay 42 also, at its armature 47, removes ground from the conductor 28 to prevent any lamp L1—L6 being lighted prematurely, and at its front contact applies ground to the release magnet 54 of the impulser switch. This switch accordingly restores to normal.

Wiper 68 upon reaching normal position breaks the circuit of relay 44, which in turn breaks the circuit of relay 42 and again prepares an operating circuit for motor magnet 50. Relay 42 upon deenergizing at armature 45 removes ground from the rotary magnet of Strowger switch #1, and at armature 47 and its resting contact supplies ground to any lamps L1—L6 which may have their circuits otherwise completed as a result of some irregularity of the multiple under test.

As previously stated if the test indicates that the multiples are O. K., relays 4 and 8, of Fig. 1, operate and in addition to preventing lamps L1 and L4 from lighting complete a circuit for starting the equipment to function to cause switches #1 and #2 to position their wipers upon the next set of contacts. This circuit extends from grounded armature 47 of relay 42 Fig. 2 and its resting contact, conductor 28, armature 5 and its resting contact, armature 11 and its working contact, armature 12 and its resting contact, working contact and armature 16, conductor 27, armature 93 and its resting contact, and the winding of relay 92 to battery. Relay 92 upon operating at its armature 96 completes a circuit for relay 90 due to the operated condition of relay 78 at this time, and at its armature 95 completes a locking circuit for itself independent of conductor 27. Relay 90 upon operating, disconnects relay 92 from conductor 27 at armature 93 and at armature 91 opens the circuit of slow release relay 94 and at this same armature extends ground by way of the working contact and armature 97, armature 79 and its working contact to conductor 55, resting contact and armature 59, to the conductor 19 extending to the rotary magnet of Strowger switch #1 thereby causing this switch to position its wipers on the second set of contacts in the first level. Since relay 90 upon operating also at its armature 91 opened the circuit of slow release relay 94 an instant later the circuit extending to the rotary magnet of Strowger switch #1 is broken at armature 97 and at armature 98 a circuit is completed from grounded armature 85 and its working contact, armature 98 and its testing contact, armature 81 and its resting contact, where the circuit provides one branch extending to the rotary magnet 82 of the counter switch and the other branch extending by way of conductor 20 to the rotary magnet of Strowger switch #2. This results in the Strowger switch #2, being also positioned on the second set of contacts in the first level and in the counter switch moving its wipers 84 and 86 another step. Lamp 1 is therefore extinguished and 2 lighted. As the level selecting switch Fig. 2 has not yet been operated its associated lamp 1, will continue to glow to indicate that testing is taking place in the first level, while in Fig. 3, the number 2 lamp will glow to indicate that the second contact set of the first level is being tested. Ordinarily these indications need not be observed by the attendant. It is only when some irregularity is found in a multiple being tested that the attendant will refer to these lamps to determine exactly where the trouble lies, the lamps L1 to L6 inclusive, of course determining just what the trouble is as hereinbefore explained.

Relay 94 upon deenergizing, at its armature 98 also breaks the holding circuit of relay 92, this latter relay accordingly restores and opens the operating circuit of slow release relay 90 which in turn restores and again completes an operating circuit for relay 92 providing the particular multiple under test is O. K. It will therefore be appreciated that as long as the multiples being tested are O. K. ground will be maintained on conductor 27 and the interaction of relays 90, 92, and 94 and rotary magnet 82 of the counter and rotary magnets of the Strowger switches will take place until all of the multiples in the particular level have been tested and in all other levels as will be subsequenty described. If during the testing of the multiples a defective one is encountered one or the other of the relays 4 and 8 will fail to operate and ground potential will consequently be removed from conductor 27. Therefore, upon the deenergization of slow release relay 90 the relay 92 will not again operate. Consequently the Strowger switches and the counter switch remain in the position set. The counter switch causes one of its associated indicating lamps to indicate the number of the multiple, and the level selector causes one of its associated indicating lamps to indicate the level upon which the switches are positioned. If the trouble is indicated as an open multiple the attendant will operate appropriate ones of the keys K1—K4, to determine which conductor of the multiple in trouble is open. The operation of one of the keys K1—K4 bridges the open, which results in the trouble lamp being extinguished and in the conductor 27 again being grounded to pull up relay 92 to cause the testing operation to proceed as before.

If the trouble lamp lighted indicates short circuited or reversed multiples the attendant causes the test to be continued by operating the trouble key K8, which directly grounds conductor 27 to cause the test to continue.

When the counter switch wiper 86 is finally moved from its ninth to its tenth contact to cause the associated "0" lamp to indicate that the last multiple of the level is under test, its associated wiper 84 leaves its bank and opens the circuit of relay 76. This relay upon restoring, at its armature 79 and its resting contact prepares a circuit over which the ground pulse over conductor 27 resulting from an O. K. tenth trunk, is distributed to the conductor 17 to cause the Strowger switches and the counter switch to be automatically restored to normal and the level selector to be advanced one step, the relay 62 being in operated position at this time.

The level selector upon moving ahead one step, at the wiper 73 opens the circuit of lamp 1 and closes the circuit of lamp 2 to indicate that the second level is under test. The shifting of wiper 72 from one contact to the other is without effect at this time. The restoration of the wipers of the counter switch places it in readiness to start indicating the numbers of the trunks being tested in the second level. The restoration of wiper 86 of the counter switch opens the circuit of relay 78. This relay upon restoring, at armature 83 again completes the operating circuit of relay 46, and at its armature 85 opens the circuit of relay 94 allowing it to restore and at its resting contact complete the previously traced operating circuit for magnet 50 of the impulser switch. Since the wiper 73 of the level selector is now on its second bank contact the wipers 70 of the impulser will not find ground until it reaches its second contact. The relay 40 is therefore operated twice this time to set the Strowger switches up opposite the second level of bank contacts before they are rotated in, in the manner previously described.

The subsequent tests are carried out in the same manner as when testing in the first level. When all of the trunks in the second level have been tested the release of the Strowger switches and counter switch, and the advance of the level selector takes place as before, and upon the Strowger switches again operating they will be moved to the third level due to the new position of the wiper 73 of level selector.

When the Strowger switches are released following the test of all multiples on the ninth level the wiper 72 of the level selector in advancing to its tenth position opens the holding circuit of slow release relay 62. This relay accordingly restores, at its armature 67 opens a point in the operating circuit of the motor magnet 64 and closes a point in the circuit of the release magnet 66. Now following the selection of the last multiple of the tenth or 0 level, ground is supplied to conductor 27 and then to the conductor 17 as a result of the trunk last tested being O. K., and the level selector, instead of being advanced another step is released to normal. The wiper 72 also upon reaching its tenth contact completed a circuit for alarm relay 60. This relay, upon operating, at its armature 61 completes a holding circuit for itself independent of wiper 72, and at its armature 63 applies battery, supplied by the start key, to the buzzer B, which starts to operate as soon as the wiper 73 reaches normal.

The attendant upon hearing the buzzer operate is thereby warned that all multiples have been tested and that the start key K10 should now be restored to normal. The restoration of key K10 removes battery from the holding circuits of relays 60, and 76 which accordingly restore. The relay 60 stops the buzzer from operating, while relay 76 merely restores to place the circuits in their original condition.

The attendant may now proceed to associate the test equipment with any other pair of switches similar to the switches #1 and #2 and proceed as before.

It sometimes occurs that for one reason or another it is desirable to make tests in only particular levels of the switches. For this purpose the key K11 has been provided. To test only the multiples in the tenth level, for instance, the attendant, before operating her start key operates level key K11 ten times, to position the wipers 72 and 73 of the level selector on their tenth bank contacts, and then operates the start key. If preferable a standard two wire calling device having its impulse contacts normally open may be used to replace the level key.

If the attendant, sometime during a test, desires to retest one of the lower levels she may do so by operating the level key to its tenth position, thereby unlocking relay 62 to prepare the release circuit of the level selector. She then releases all operated equipment by operating the release key, to ground the common release conductor 17. The attendant may then again operate the level key to cause testing to be started in any desired level.

From the foregoing it will be seen that applicant has designed relatively simple testing equipment which will enable tests to be made and the ordinary cases of trouble to be found in a large number of bank multiples without the consummation of any great amount of time or trouble.

What is claimed is:

1. In combination with a pair of switches each having access to the opposite ends of groups of conductors, means for automatically connecting said switches with one of the groups and, in doing so, connecting certain of the conductors in series with each other, means also connected in series with said conductors for testing for another than normal condition of the conductors of the group connected with, and means for automatically causing the said switches to connect with another group if the conductors of one previously tested were found normal.

2. In a device for testing each conductor of groups of conductors for ground potential, short circuits, open circuits and reversals, signals adapted to be operated only when said conditions exist, means for automatically connecting with the conductors of one group, testing it and if no condition exists passing on to the next and for repeating the operation until all groups have been tested and means for stopping the testing operation when any such condition is encountered and operating a certain one of said signals.

3. A plurality of groups of conductors, equipment for testing the conductors of said groups individually for grounds, short circuits, open circuits, or reversals thereof, a plurality of indicating lamps, there being a lamp for indicating each type of trouble, and means for controlling the lighting of said lights also effective to associate the testing equipment with another of said groups if the conductors of the group tested do not cause the lighting up of any of said trouble indicating lamps.

4. In combination with a pair of automatic switches having a same plurality of four conductor multiples accessible to each of them, of equipment with means for connecting with the wipers and operating and release magnets of said switches, and means for causing said switches to move their wipers into connection with a multiple, test the multiple for trouble and to then cause the switches to move their wipers onto the next multiple if no trouble is detected on the last tested multiple.

5. In combination with a pair of automatic switches having a same plurality of four conductor multiples accessible to each of them, of equipment with means for connecting with the wipers and operating and release magnets of said switches, and means for restoring said switches following a test of certain of said multiples and for causing said switches to then automatically operate to repeat the test over other of said multiples.

6. In combination with a plurality of groups of sets of conductors having their opposite ends terminating in banks of contacts, automatic switches having wipers for connecting with any set of any group of said conductors, means for causing said switches to contact with a group and a set of that group of conductors, a group of differential relays connected in circuit with said conductors for testing the set connected with, and means for indicating what group and what set of the group is connected with and the character of trouble if any is encountered.

7. In combination with a multiple conductor trunk line, testing means for indicating any of a plurality of defects the trunk line is subject to, said means including a plurality of differential relays temporarily connected in series with the various conductors of the trunk and indicating lamps influenced thereby.

8. In combination with a multiple conductor trunk line consisting of two line and two private conductors, testing means comprising a pair of relays connected in series with said line conductors, another pair of relays connected in series with said private conductors, a plurality of trouble indicating lamps, and circuit connections for said lamps under control of said relays for causing particular different ones of said lamps to light if the line conductors are short circuited, reversed or either of them are open, and for operating particular other of said lamps if a similar condition exists on the private conductors.

9. In an arrangement for detecting unstandard conditions of or between a pair of conductors, a battery, a differential relay having a terminal of one of its windings connected to said battery, a second differential relay having a terminal of one of its windings connected with the other terminal of said battery, means for connecting the other terminals of said windings to said conductors and for also connecting the other windings of said relays in circuit with said conductors to test them for possible unstandard conditions.

10. In a device for testing for unstandard conditions of the conductors or multiples of a telephone exchange system, a plurality of differential relays, means for connecting said relays into circuit relation with each other and with the conductors of a multiple, signalling devices for indicating the character of unstandard conditions encountered, and circuits controlled by said relays for causing the energization of said signals.

11. In combination with a telephone equipment which includes groups of trunk multiples and two motion type automatic switches having access to said multiples, test equipment for testing the said multiples for unstandard conditions, means for utilizing said automatic switches for connecting the test equipment with the said multiples including apparatus and circuit arrangements for causing said switches to first elevate their wipers adjacent one group of said trunk multiples, to then cause them to connect with the multiples of that group in a definite sequence so that the test equipment may test them, automatic means for causing the said switches to be restored and reoperated into association with the next group when all multiples of the first group have been tested and for causing said switches to be automatically restored and reoperated repeatedly until all trunks have been tested.

12. In an arrangement for testing bank multiples which terminate in banks of contact sets in which the contact sets are arranged in horizontal rows or levels and wherein switches are provided with wipers and with means for elevating and rotating them over any row or level of contacts, testing equipment, means for temporarily associating said equipment with the wipers of a pair of the provided switches, and other means also temporarily associated with said switches to automatically cause them to momentarily position their wipers into engagement with each contact set until all have been engaged or a defective condition encountered.

13. In an arrangement for testing bank multiples which terminate in banks of contact sets in which the contact sets are arranged in horizontal rows or levels and wherein switches are provided with wipers and with means for elevating and rotating them over any row or level of contacts, equipment for indicating the number of the multiple with which the switches are in engagement and for indicating the character of trouble encountered, means for temporarily associating said equipment with the wipers of a pair of the provided switches, and other means also temporarily associated with said switches for automatically causing them to momentarily position their wipers into engagement with each contact set until all have been encountered or until a defective condition is encountered.

14. In an arrangement for testing bank multiples which terminate in banks of contact sets and which are arranged in horizontal rows or levels and wherein switches are provided having wipers with means for rotating them over any row or level of contacts, testing equipment, means for temporarily associating said equipment with the wipers of a pair of the switches, means in said test equipment for automatically operating said switches to position their wipers on a particular level and then a particular contact in the level, a signal associated with each level and each contact in the level and operated to indicate the position of said wipers on a particular contact set, and means comprising other signals for indicating the condition of the bank multiples said wipers are connected with.

15. An arrangement for testing for unstandard conditions of and between the conductors of groups of multiples of a telephone exchange system, comprising a plurality of multiple connections, contacts connected to the conductors at each end of such multiple connections, automatic switches having access to said contacts, testing equipment and means for associating it with said automatic switches, other equipment and means for also associating it with said automatic switches, said automatic switches being automatically controlled by said other equipment to connect said testing equipment with each multiple of a group successively until all have been tested, said other equipment responsive to the completion of the testing of all multiples in that group for causing said switches to restore and reposition themselves successively into connective relation with the multiples of the succeeding group.

16. In combination with a pair of automatic switches and groups of multiples, each multiple having conductors accessible to said switches, testing equipment with means for connecting it to the wipers of said switches, means for operating said switches to connect said equipment to the conductors of a multiple of one group to test for unstandard conditions therein and for thereafter operating said switches to successively connect to other multiples of the group, said means responsive to the completion of the testing of all multiples of the group for restoring and reoperating said switches to connect said equipment to a multiple of a second group for testing all of the multiples of the group, and means for automatically stopping the testing operations if an unstandard condition is encountered.

17. In combination with a pair of automatic switches and groups of multiples, each multiple having conductors accessible to said switches, testing equipment with means for connecting it to the wipers of said switches, means for operating said switches to connect said equipment to the conductors of a multiple of one group to test for unstandard conditions therein and for thereafter operating said switches to successively connect to other multiples of the group, said means responsive to the completion of the testing of all multiples of the group for restoring and reoperating said switches to connect said equipment to a multiple of a second group for testing all of the multiples of the group, means for automatically stopping the testing operations if an unstandard condition is encountered, and means for thereafter causing said equipment to pass over the multiple in which the unstandard condition is found and to proceed with testing of another multiple.

In witness whereof, I hereunto subscribe my name this 17th day of March, A. D. 1926.

VICTOR S. THARP.